US011947986B2

United States Patent
Mitra et al.

(10) Patent No.: US 11,947,986 B2
(45) Date of Patent: *Apr. 2, 2024

(54) TENANT-SIDE DETECTION, CLASSIFICATION, AND MITIGATION OF NOISY-NEIGHBOR-INDUCED PERFORMANCE DEGRADATION

(71) Applicant: Adobe Inc., San Jose, CA (US)

(72) Inventors: Subrata Mitra, Karnataka (IN); Sopan Khosla, Karnataka (IN); Sanket Vaibhav Mehta, Pittsburg, PA (US); Mekala Rajasekhar Reddy, West Bengal (IN); Aashaka Dhaval Shah, Uttarakhand (IN)

(73) Assignee: Adobe Inc., San Jose, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 17/355,481

(22) Filed: Jun. 23, 2021

(65) Prior Publication Data

US 2021/0318898 A1 Oct. 14, 2021

Related U.S. Application Data

(63) Continuation of application No. 15/983,390, filed on May 18, 2018, now Pat. No. 11,086,646.

(51) Int. Cl.
*G06F 9/455* (2018.01)
*G06F 9/54* (2006.01)
(Continued)

(52) U.S. Cl.
CPC ...... *G06F 9/45504* (2013.01); *G06F 9/45533* (2013.01); *G06F 9/45558* (2013.01);
(Continued)

(58) Field of Classification Search
CPC ............ G06F 9/45504; G06F 9/45533; G06F 9/45558; G06F 9/547; G06F 21/566;
(Continued)

(56) References Cited

U.S. PATENT DOCUMENTS 10,055,275 B2 8/2018 Razin et al.
10,102,056 B1 10/2018 Goldberg
(Continued)

OTHER PUBLICATIONS

"Linux Performance Analysis in 60,000 Milliseconds—Netflix TechBlog—Medium", Netflix Technology Blog, Medium.com, pp. 1-13 (Nov. 30, 2015) Retrieved from the internet URL: https://medium.com/nelflix-techblog/linux-performance-analysisn-60-000-milliseconds-accc10403c55, Retrieved on : Mar. 9, 2018.
(Continued)

*Primary Examiner* — Kibrom K Gebresilassie
(74) *Attorney, Agent, or Firm* — Shook, Hardy & Bacon L.L.P.

(57) ABSTRACT

Embodiments relate to tenant-side detection and mitigation of performance degradation resulting from interference generated by a noisy neighbor in a distributed computing environment. A first machine-learning model such as a k-means nearest neighbor classifier is operated by a tenant to detect an anomaly with a computer system emulator resulting from a co-located noisy neighbor. A second machine-learning model such as a multi-class classifier is operated by the tenant to identify a contended resource associated with the anomaly. A corresponding trigger signal is generated and provided to trigger various mitigation responses, including an application/framework-specific mitigation strategy (e.g., triggered approximations in application/framework performance, best-efforts paths, run-time changes, etc.), load-balancing, scaling out, updates to a scheduler to avoid impacted nodes, and the like. In this manner, a tenant can (Continued)

detect, classify, and mitigate performance degradation resulting from a noisy neighbor.

20 Claims, 6 Drawing Sheets

(51) Int. Cl.
*G06F 21/56* (2013.01)
*G06N 20/00* (2019.01)
*G06F 21/57* (2013.01)
*H04L 9/40* (2022.01)

(52) U.S. Cl.
CPC ............ *G06F 9/547* (2013.01); *G06F 21/566* (2013.01); *G06N 20/00* (2019.01); *G06F 2009/45587* (2013.01); *G06F 2009/45595* (2013.01); *G06F 21/577* (2013.01); *H04L 63/1425* (2013.01); *H04L 63/145* (2013.01)

(58) Field of Classification Search
CPC ......... G06F 21/577; G06F 2009/45587; G06F 2009/45595; G06N 20/00; H04L 63/1425; H04L 63/145
See application file for complete search history.

(56) References Cited

U.S. PATENT DOCUMENTS

| | | |
|---|---|---|
| 10,380,339 B1 | 8/2019 | Appalaraju et al. |
| 10,397,255 B1 | 8/2019 | Bhalotra et al. |
| 10,432,652 B1 | 10/2019 | Yona et al. |
| 10,673,885 B2 | 6/2020 | Muthukrishnan et al. |
| 10,699,012 B2 | 6/2020 | Kashyap et al. |
| 10,705,940 B2 | 7/2020 | Gaber et al. |
| 10,936,717 B1 | 3/2021 | Herman Saffar et al. |
| 2013/0174128 A1 | 7/2013 | Kansal et al. |
| 2014/0122691 A1 | 5/2014 | Simhon et al. |
| 2017/0070406 A1 | 3/2017 | Yanagisawa |
| 2017/0147383 A1* | 5/2017 | Hudzia ................ G06F 9/5088 |
| 2017/0155672 A1 | 6/2017 | Muthukrishnan et al. |
| 2017/0359372 A1 | 12/2017 | Ronen et al. |
| 2018/0288063 A1 | 10/2018 | Koottayi et al. |
| 2019/0068622 A1 | 2/2019 | Lin et al. |
| 2019/0068627 A1 | 2/2019 | Thampy |
| 2019/0123973 A1* | 4/2019 | Jeuk ..................... G06F 9/5027 |
| 2019/0379705 A1 | 12/2019 | Murphy et al. |
| 2019/0391891 A1 | 12/2019 | Gupta et al. |
| 2020/0244674 A1 | 7/2020 | Arzani et al. |
| 2020/0285737 A1 | 9/2020 | Kraus et al. |
| 2021/0067419 A1 | 3/2021 | Adam et al. |

OTHER PUBLICATIONS

Burns, B., et al., "Borg, Omega, and Kubernetes—Lessons Learned From Three Container Management Systems Over A Decade", vol. 14, Issue 1, pp. 70-93 (2016).
Caglar, F., et al., "A performance Interference-aware Virtual Machine Placement strategy for Supporting Soft Real-Time Application in the Cloud", pp. 1-6 (2013).
Chen, X., et al., "CloudScope: Diagnosing and Managing Performance Interference in Multi-Tenant Clouds", In IEEE 23rd International Symposium on Modeling, Analysis and Simulation of Computer and Telecommunication Systems (MASCOTS), pp. 1-10 (2015).
Chen, X.,"Diagnosing, Predicting and Managing Application Performance in Virtualised Multi-Tenant Clouds", pp. 1-157 (Jul. 2016).
Delimitrou, C., aand Kozyrakis, C., "iBench: Quantifying Interference for Datacenter Applications" In IEEE International Symposium on Workload Characterization (IISWC), pp. 1-7 (Sep. 2013).
Mars, J., et al., "Contention Aware Execution: Online Contention Detection and Response", ACM, pp. 257-265 (Apr. 2010).
Novakovic, D., et al., (2013), "Deepdive: Transparently Identifying and Managing Performance Interference in Virtualized Environments", In Proceedings of the USENIX Annual Technical Conference, pp. 219-230 (2013).
Ordozgoiti, B., et al., "Deep convolutional neural networks for detecting noisy neighbours in cloud infrastructure", In Proceedings of the 25th European Symposium of Artificial Neural Networks Computational Intelligence and Machine Learning (ESANN), pp. 571-576 (2017).
Shue, D., et al., "Performance Isolation and Fairness for Multi-Tenant Cloud Storage", 10th USENIX Symposium on Operating Systems Design and Implementation, USENIX Association, vol. 12, pp. 349-362 (Oct. 2012).
Varadarajan, V., et al., "Resource-Freeing Attacks: Improve Your Cloud Performance (at Your Neighbor's Expense)", In Proceedings of the ACM Conference on Computer and Communications Security, pp. 1-12 (Oct. 2012).
Zhang, T., et al., "DOS Attacks on Your Memory in the Cloud", In Proceedings of the ACM on Asia Conference on Computer and Communications Security, pp. 1-13 (Apr. 2017).
Zhang, X., et al., "CPI2: CPU performance isolation for shared compute clusters", In Proceedings of the 8th ACM European Conference on Computer Systems, pp. 379-391 (Apr. 2013).

* cited by examiner

TENANT-SIDE DETECTION, CLASSIFICATION, AND MITIGATION OF NOISY-NEIGHBOR-INDUCED PERFORMANCE DEGRADATION

CROSS-REFERENCE TO RELATED APPLICATIONS

This application is a Continuation of U.S. patent application Ser. No. 15/983,390 filed May 18, 2018, now Pat. No. 11,086,646, the entire contents of which are incorporated by reference herein in their entirety.

BACKGROUND

Increasingly, companies are shifting their digital marketing and digital services offerings away from locally-installed software platforms and towards cloud-based application offerings (e.g., subscription-based offerings). With these cloud-based software-as-a-service (SaaS) application offerings, customer applications and programs are run inside of computer system emulators (e.g., virtual machines, software containers, and the like). While there are privately hosted and managed cloud architectures that provide such managed application hosting services, companies routinely utilize third-party cloud provider services to host their end user applications and programs.

Within a distributed computing (i.e., cloud computing) environment, a virtual machine allocated to one tenant is, in many cases, run alongside other virtual machines utilized by other tenants on the same physical machine. These co-located virtual machines often share and even contest for the same physical resources (e.g., last-level-cache, memory-bandwidth, network transfers, etc.). In some cases, an aggressive, co-located tenant can degrade the performance of other co-located tenants, resulting in extreme slow-down, poor quality-of-service, and substandard end user experience.

SUMMARY

Embodiments of the present disclosure relate to tenant-side detection and mitigation of performance degradation resulting from interference generated by a noisy neighbor in a distributed computing environment. Generally, a first machine-learning model such as a k-means nearest neighbor classifier can be operated by a tenant to detect an anomaly with a computer system emulator (e.g., a virtual machine, software container, etc.) in the distributed computing environment resulting from a co-located noisy neighbor. A second machine-learning model such as a multi-class classifier can be operated by the tenant to identify a contended resource associated with the anomaly. A corresponding trigger signal can be generated and provided to trigger various mitigation responses, including an application/framework-specific mitigation strategy (e.g., triggered approximations in application/framework performance, best-efforts paths, run-time changes, etc.), load-balancing, scaling out, updates to a scheduler to avoid impacted nodes, and others.

The machine-learning models can be trained in various ways. For example, co-located computer system emulators residing on the same physical machine (e.g., node) can be detected or otherwise identified from a plurality of nodes on which a tenant operates in a distributed computing environment. For example, a tenant may be able to control the allocation of emulators in a dedicated host. In some embodiments, emulators can be spawned and operations can be performed to stress a co-located emulator utilizing shared resources. If a performance impact is measured on another emulator, the stressed emulator can be determined to be co-located with an impacted emulator. In order to generate training data for the models, interference is simulated and application and/or framework-level metrics are collected from the nodes of the tenant (including the nodes on which the identified co-located emulators reside). The collected metrics can be normalized across all associated emulators (e.g., across all virtual machines performing a particular distributed task), for example, with respect to a representative characteristic of the distributed task. Nodes without impacted metrics are labeled healthy, and nodes with impacted metrics are labeled anomalies.

A first machine learning model (e.g., k-nearest neighbor classifier) can accept as an input a feature vector generated from the normalized, collected metrics. The first machine learning model can be trained using the labeled training data to identify an anomalous node with performance degradation resulting from interference from a noisy neighbor. Training data for a second machine-learning model can be generated by determining the Euclidean distance between a feature vector reflecting the collected application-level and/or framework-level metrics and the centroids of corresponding clusters, and generating labels according to the corresponding resource contention that was simulated. The resulting training data can be used to train the second machine-learning model to identify the particular resource being contended.

As such, techniques described herein facilitate tenant-side identification of distributed computing performance degradation resulting from a noisy neighbor, classification of a corresponding contended resources, and various triggered mitigation responses.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments are described in detail below with reference to the attached drawing figures, wherein.

DETAILED DESCRIPTION

Overview

Figure 1:
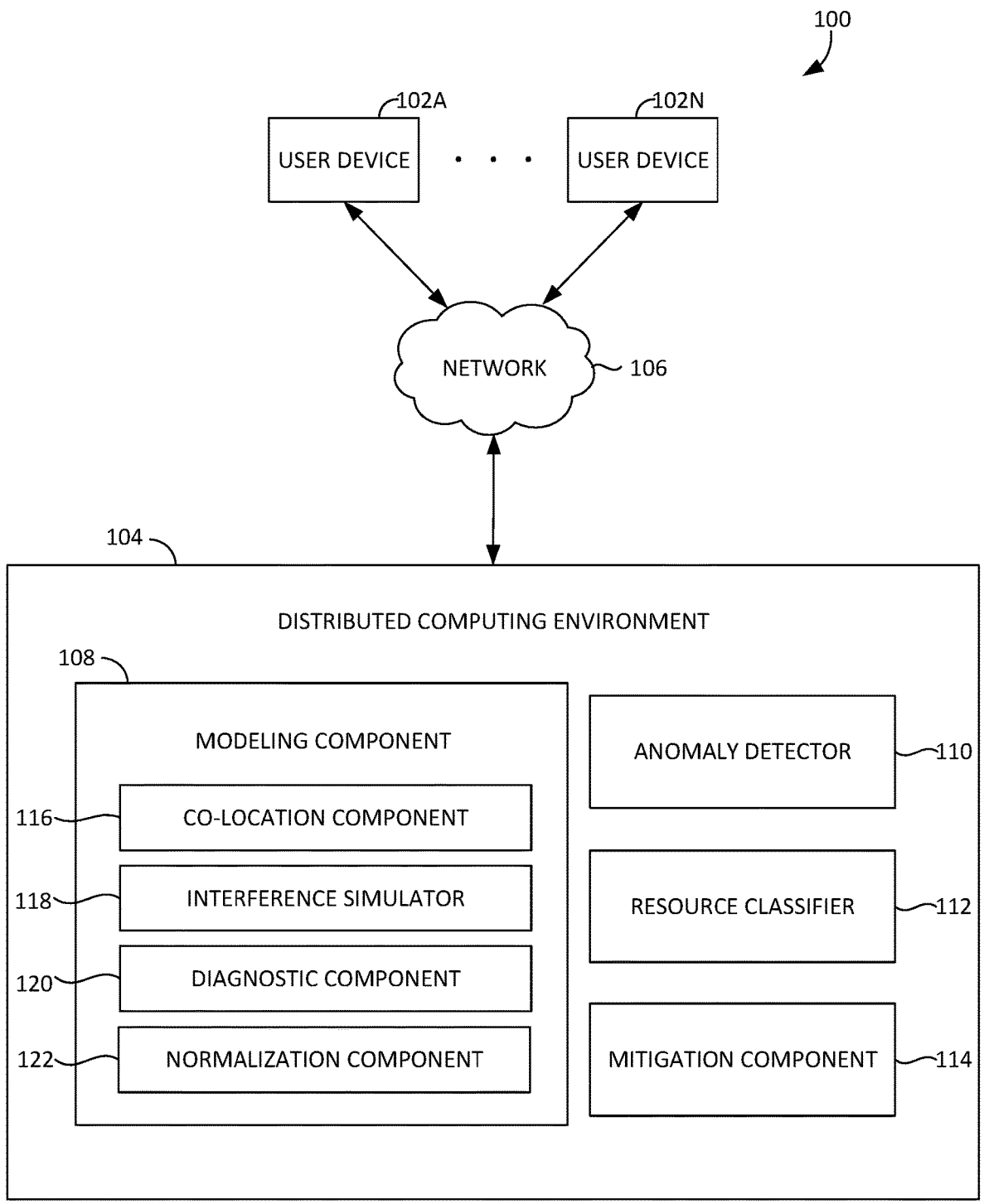
FIG. 1 is a schematic depiction of a system for facilitating automatic tenant-side detection, classification, and mitigation of noisy-neighbor induced performance degradation, in accordance with some implementations of the present disclosure.

Increasingly, companies are shifting away from locally installed software and focusing on cloud-based SaaS offerings (e.g., subscription-based offerings). SaaS offerings require no local installation of software, but rather the real time "login" onto an application or program hosted on the cloud. Using a cloud-based SaaS structure allows users to access applications and programs hosted on the cloud without the need to download or install software.

Because SaaS services are not locally installed on a user's hardware device, they are oftentimes run inside of computer system emulators (e.g., virtual machines, software containers, and the like) within a cloud infrastructure. To provide SaaS services to their customers, companies sometimes build and manage privately hosted cloud architectures to ensure increased security and improved quality of SaaS offerings to their customers. Oftentimes, companies rent cloud infrastructure to host their SaaS applications and programs. One reason for renting cloud resources is that third-party cloud providers and other multi-tenant environments offer relatively lower cost of computation because they make better use of system resources by running more than one tenant, or more than one application or program, on the same physical hardware sharing the same physical resources.

Within a cloud computing environment, a computer system emulator (e.g., virtual machine, software container) operated by a tenant is in many cases run alongside other virtual machines utilized by other tenants on the same physical machine. These co-located virtual machines oftentimes share and even compete for the same physical resources (e.g., last-level-cache, memory-bandwidth, network transfers, etc.). In some cases, an aggressive co-located tenant can degrade the performance of other co-located tenants, resulting in reduced speed of performance, poor quality-of-service, substandard end user experience, unpredictable performance, and other types of performance interference.

In conventional systems, a cloud provider can identify and mitigate issues with contended resources. However, these conventional techniques have various shortcomings. Generally, when tenants share physical resources, there are no conventional techniques for one of the tenants to identity or mitigate issues with contended resources resulting from a noisy neighbor. Instead, it is the cloud providers that traditionally attempt to limit performance degradation of co-located tenants contending for the same physical resources. In one approach, the cloud provider collects low-level hardware performance metrics to identify and mitigate performance degradation of virtual machines. While this technique may detect some forms of virtual machine performance degradation, tenants do not have access to the low-level hardware metrics that cloud providers do. Further, cloud providers do not have visibility into whether a given tenant's application is impacted by resource contention. Moreover, some interference such as memory-bus-blocking can never be detected by monitoring low-level hardware. Additionally, such low-level hardware metrics can be noisy (e.g., caused by various other factors other than resource contention, such as garbage-collection, etc.) and can thus create performance degradation false alarms. Other proposed techniques in the virtualized multi-tenant cloud space require explicit access to a hypervisor layer and/or hardware characteristics of different virtual machine workloads. However, the hypervisor layer and workload characteristics are not available to tenants for detecting and mitigating issues resulting from noisy neighbors.

There have also been some efforts by cloud providers to identify performance degradation on various virtual machines within a cloud infrastructure by running periodic diagnostic tests. If a bottleneck or other performance degradation is detected at the time the test is performed, the cloud provider can abandon the particular instance of the virtual machine under test. While this technique may detect some performance degradation, it cannot detect whether a noisy-neighbor is co-located with the virtual machine experiencing performance degradation. Further, because resource usage intensity by noisy neighbors can change over time, periodic testing can fail to detect periods of performance degradation. Finally, this technique is exclusively available to cloud providers, as tenants cannot perform such bottleneck tests.

Accordingly, embodiments described herein are directed to tenant-side techniques for automatically detecting, classifying, and mitigating performance degradation of a computing system emulator resulting from a noisy neighbor in a distributed computing environment. In this regard, embodiments described herein automatically detect anomalies impacting shared resources, identify which specific resource is contended, and facilitate mitigation of the contention. Generally, co-located emulators are identified, interferences are simulated, and relevant metrics are collected and normalized. A first machine learning model (such as a k-nearest neighbor classifier) can be trained to identify anomalies among shared resources, and a second machine learning model (such as a multi-class classifier or resource classifier) can be trained to identify which resource is contended. Corresponding detection signals can trigger various mitigation techniques, such as automatically reducing application performance, adjusting weights on a load balancer, spawning new emulators, avoiding impacted nodes, and the like.

Various techniques can be applied to train the models. For example, co-located emulators (e.g., virtual machines, software containers, etc.) can be identified and noisy-neighbor interference can be simulated in order to collect and normalize healthy and anomalous (e.g., contended) resource behavior. Generally, a noisy-neighbor can be simulated by co-locating a second application running on a second emulator (e.g., virtual machine) on the same physical machine as a first application running on a first emulator (e.g., virtual machine), for example, in a cloud computing environment. In some embodiments, a tenant can control the allocation of applications to a dedicated host. In some embodiment, a tenant can follow a trial and error method by starting several VMs within a fixed timeframe, using a particular strategy, so that the chance of co-location increases. Additionally and/or alternatively, to ensure co-location of emulators, automated tests can be performed that aggressively use shared resources along different resource dimensions (e.g., L3 cache, memory-bandwidth, network, etc.). Co-located emulators can be automatically identified based on a determination that resource usage by a first virtual machine impacts the second virtual machine.

Once co-location is confirmed, benchmark testing can be performed to simulate noisy-neighbors by stressing different shared resources with varying intensities, and corresponding metrics can be collected and normalized. Various benchmark testing can be implemented, such as that described in Delimitrou and Kozyrakis, *iBench: Quantifying Interference for Datacenter Applications*, IISWC Portland, September 2013; T. Zhang, Y. Zhang, and R. Lee, *DoS Attacks on Your Memory in Cloud*, ASIA CCS ACM '17, 253-265 (2017); Varadarajan, Kooburat, Farley, Ristenpart and Swift, *Resource-Freeing Attacks: Improve Your Cloud Performance (at Your Neighbor's Expense)*, ACM CCS '12 (2012), and the like. These benchmark tests can be performed on the node on which the co-located virtual machines reside, along with other nodes used by or otherwise associated with a particular application or framework. An application programming interface (API) may be used to extract application-level and/or framework-level metrics at runtime from the nodes. The metrics can include various application and software framework specific performance and Quality-of-Service indicators such as, but not limited to: latency, throughput, inter-component delays, JVM heap, non-heap memory, GC cycles, number of threads, data read/write rate over the network, IO read/write rate, and the like. These collected metrics are advantageously scaled with respect to a representative characteristic of a distributed task (e.g., amount of computation) in order to normalize the impact of contended resources across associated virtual machines or software containers.

Generally, an anomaly detector can be trained in various ways. For example, an application can be operated in a cloud computing environment without any noisy-neighbor interference. Baseline metrics can be collected and labeled as healthy behavior. Similarly, the application can be run while interference is selectively simulated along different resource dimensions and in selected nodes. When particular resources are impacted, corresponding metrics can be collected and labeled anomalous. This labeled data can be used as a training dataset for a machine learning model such as a k-means nearest neighbor classifier. For example, a feature vector can be constructed from designated metrics (e.g., normalized metrics), and an anomaly can be detected on a node based on the distance between the feature vector and the centroids of k-means clusters. In some embodiments, a particular anomaly detector can detect anomalies for more than one node, and in some cases, for all nodes. Additionally and/or alternatively, multiple anomaly detectors can be applied, for example, with a single anomaly detector dedicated to identifying anomalies in one or more nodes and another anomaly detector dedicated to identifying anomalies in the remaining nodes. As such, these techniques can model healthy and anomalous behavior of a node associated with an application or framework. In operation, using an anomaly detector, nodes which are impacted by noisy-neighbors can be automatically identified.

In some embodiments, a resource classifier (e.g., a neural network, multi-class classifier) can be trained to identify (e.g., predict) which resource is contended during an anomaly. For example, a classifier can be trained to identify a particular resource using as an input feature vectors reflecting various collected application-level and/or framework-level metrics. In other words, a multi-class classifier can be used to attribute performance degradation resulting from resource contention to a particular shared resource. To train the classifier, the Euclidean-distance between the feature vector and the centroids of the clusters can be calculated and labelled according to the corresponding resource contention that was simulated. In some embodiments, the number of classes (e.g., labels) is equal to the number of contended resources identified during benchmark testing. Using this labelled training data, the multi-class classifier can be trained to identify, from a given anomalous vector of metrics, which resource is being contended by a noisy-neighbor.

Generally, the output of the anomaly detector and/or resource classifier can indicate if an application is suffering from interference, and if so, which resource is being contended. If the anomaly detector and/or resource classifier indicates resource contention, a corresponding signal can be generated to trigger a designated mitigation response to reduce pressure on a contended resource and achieve low latency in the presence of interference. The mitigation response can include, for example, application/framework-specific mitigation strategies (e.g., triggered approximations in application/framework performance, best-efforts paths, run-time changes, etc.), adjustments to load-balancing, scaling-out (e.g., spawning new computer system emulators), providing a notification of anticipated performance delays to a scheduler to avoid affected nodes, and/or other techniques that can facilitate mitigating steps to reduce pressure on a contended resource.

As such, using implementations described herein, a tenant can automatically detect, classify, and mitigate noisy-neighbor-induced performance degradation. These automatic detection, classification, and mitigation techniques can improve end-user experience by enabling tenant-side detection of impacted applications by noisy neighbors, identification of the contended resource, and facilitation of tenant-side mitigation. Application-level and/or framework-level metrics available to tenants can be used to build machine-learning-based anomaly detection and/or resource identification models, providing detection capabilities to tenants. As such, techniques described herein thereby expand on conventional techniques that require cloud providers to detect and mitigate performance degradation. In this manner, the anomaly detector and/or resource classifier output(s) can trigger or otherwise enable tenants and/or end users to perform mitigation strategies that would not otherwise be available. Accordingly, the techniques described herein improve upon conventional techniques by reducing dependency on cloud providers and by providing tenant-side access to detection, classification, and mitigation of noisy-neighbor-induced performance degradation.

Having briefly described an overview of aspects of the present invention, various terms used throughout this description are provided. Although more details regarding various terms are provided throughout this description, general descriptions of some terms are included below to provide a clearer understanding of the ideas disclosed herein:

Tenant—As used herein, the term "tenant" refers to an entity that utilizes resources of a cloud computing environment. For example, the entity may be a customer of a provider of the cloud computing environment, such that the customer operates or otherwise controls any number of computer system emulators (e.g., virtual machines) residing on any number of physical machines in the cloud computing environment. By way of nonlimiting example, an entity that operates software hosted in the cloud computing environment (e.g., to provide the software as a service to its own customers) is a tenant of the third-party cloud provider.

Computer system emulator—As used herein, the term "computer system emulator" refers to software that virtualizes a computer system within another computer system, allowing the virtualized computer system to behave like (e.g., emulate) another computer system. In one example, a virtual machine operating on a node in a cloud computing environment can emulate a physical computer. In another example, a software container (an OS-level light-weight virtualization method that shares physical resources between applications) operating on a physical machine can emulate an operating system. Any suitable number of software applications can operate on a single computer system emulator, and any suitable number of computer system emulators can operate on a single physical machine.

Co-located—As used herein, the term "co-located" refers to the presence of more than one computer system emulator (e.g., virtual machine, software container) on the same physical machine, and sharing at least one physical resource of the physical machine, within a cloud computing environment. By way of nonlimiting example, a first virtual machine located on a physical machine in a cloud computing environment and sharing at least one physical resource (e.g., L3 cache, memory-bandwidth, etc.) with a second virtual machine located on the same physical machine is co-located with the second virtual machine.

Noisy-neighbor—As used herein, the term "noisy-neighbor" refers to a co-located computer system emulator (e.g., virtual machine, software container) that interferes with or otherwise impacts usage of at least one shared physical resource by a second computer system emulator, for example, in a cloud computing environment. When a physical resource experiences contention based on usage by a co-located computer system emulator, it negatively impacts other co-located computer system emulators by interfering with access to the contended physical resource. By way of nonlimiting example, if a first virtual machine on a node demands a particular memory-bandwidth from the node and negatively impacts a second virtual machine (e.g., resulting in application runtime slow-down or some other impact to user experience), the first virtual machine is a noisy-neighbor of the second virtual machine.

Contended resource—As used herein, the term "contended resource" refers to a shared resource (e.g., memory-bandwidth, last-level-cache, network transfers, etc.) experiencing resource contention. For example, a contended resource may be located on a physical machine within a cloud computing environment and utilized by two or more co-located computer system emulators. By way of nonlimiting example, if a first virtual machine needs memory-bandwidth to run a first application on a physical machine, and a second virtual machine uses the same memory-bandwidth to run a second application on the same physical machine, memory-bandwidth is a contended resource.

Anomaly—As used herein, the term "anomaly" refers to a degradation of performance of one or more computing resources in a distributed computing environment. Embodiments herein utilize a machine learning model to automatically detect anomalies generated by a co-located noisy neighbor interfering with access to a contended resource.

Exemplary Anomaly Mitigation Environment

Referring now to FIG. 1, a schematic depiction is provided illustrating an exemplary system 100 suitable for use in implementing embodiments of the present disclosure. Generally, system 100 is suitable for tenant-side detection, classification, and/or mitigation of noisy-neighbor-induced performance degradation. Among other components not shown, system 100 may include any number of user devices 102A through 102N and distributed computing environment 104, which itself may include modeling component 108, anomaly detector 110, resource classifier 112, and mitigation component 114. Generally, modeling component 108 facilitates the detection of co-located emulators, the simulation of application interference caused by resource contention, the collection of application/framework-level metrics, and the normalization of collected metrics. In the embodiment illustrated in FIG. 1, anomaly detector 110 detects anomalies on nodes of distributed computing environment 104, resource classifier 112 identifies resource contention associated with an anomaly, and mitigation component 114 facilitates steps to mitigate performance degradation experienced by tenant(s), customer(s) of tenant(s), etc., resulting from an anomaly. It should be understood that the system 100 shown in FIG. 1 is an example of one suitable computing system. Any of the components shown in FIG. 1 may be implemented via any type of computing device, such as computing device 600 described below with reference to FIG. 6. The components may communicate with each other via one or more networks 106, which may include, without limitation, one or more local area networks (LANs) and/or wide area networks (WANs). Such networking environments are commonplace in offices, enterprise-wide computer networks, intranets, and the Internet.

In some cases, user device 102A accesses the distributed computing environment 104 via a web browser, terminal, or standalone PC application operable on the user device. By way of nonlimiting example, user device 102A may be operated by an administrator (e.g., for a tenant of distributed computing environment 104, or a customer thereof), who may be an individual(s) that manages cloud-based applications for an enterprise. Additionally and/or alternatively, user device 102A may be operated by an individual who has access to a subscription for an application hosted in the distributed computing environment 104 (e.g., by a tenant of distributed computing environment 104). User devices 102A through 102N may take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

In the embodiment illustrated in FIG. 1, modeling component 108 facilitates training anomaly detector 110 and/or resource classifier 112. For example, modeling component 108 may be used by a tenant (e.g., a tenant administrator) to model performance degradation on nodes of distributed computing environment 104 in which the tenant operates. Generally, modeling component 108 performs or otherwise facilitates identification of co-located emulators on nodes associated with a tenant, simulation of interference caused by resource contention, collection of corresponding metrics, and/or normalization of the collected metrics. Modeling component 108 may include co-location component 116, interference simulator 118, diagnostic component 120, and normalization component 122. Although illustrated as separate components of modeling component 108, any number of components can be used to perform the functionality described herein.

Co-location component 116 detects the presence of co-located computer system emulators (e.g., virtual machines) of a tenant on the same physical machine in a cloud environment (e.g., distributed computing environment 104). In some embodiments, co-location component 116 can run a test or a set of tests to detect co-located applications running on separate computer system emulators. In this regard, the test or set of tests may automatically attempt to stress computer system emulators to use shared resources along different dimensions (e.g., L3 cache, memory-bandwidth, etc.) and detect impacts on other computer system emulators. By way of nonlimiting example, co-location component 116 can perform an automated test to stress shared resources to determine if a first and a second virtual machine are co-located in distributed computing environment 104. Additionally and/or alternatively, co-location component 116 can provide a user interface to facilitate a tenant (e.g., an administrator using user device 102A) or other associated user to control the allocation of virtual machines and/or associated applications to a dedicated host in distributed computing environment 104 to ensure co-location. These and other variations for identifying co-located emulators will be understood by those of ordinary skill in the art.

Interference simulator 118 simulates application interference by stressing resources shared by co-located computer system emulators. In this regard, interference simulator 118 can perform or otherwise facilitate benchmark testing to simulate noisy-neighbors by stressing different shared resources with varying intensities, as will be understood by those of ordinary skill in the art. These benchmark tests can be performed on various physical machines (e.g., node) on which the tenant operates (e.g., nodes used by or otherwise associated with a particular application or framework), including the nodes on which the identified co-located computer system emulators operate.

Diagnostic component 120 collects corresponding metrics from the nodes. In this regard, diagnostic component 120 collects resulting metrics from the benchmark tests performed by interference simulator 118. For example, diagnostic component 120 may use an application programming interface or other suitable collection technique to extract application-level and/or framework-level metrics available to the tenant (e.g., at runtime) from various nodes (e.g., some or all nodes operating or otherwise associated with an application or framework of the tenant running in a computer system emulator operated by the tenant). Advantageously all associated nodes are tested and metrics collected, because in many distributed computing environments, most virtual machines will be located on multiple machines, so impacts from interference can occur on only a subset of the machines (e.g., one virtual machine). Metrics diagnostic component 120 may collect any type of suitable metric. By way of nonlimiting example, such metrics can include latency, throughput, inter-component delays, JVM heap, non-heap memory, GC cycles, number of threads, data read/write rate over the network, IO read/write rate, and the like. These and other variations for collecting metrics will be understood and are contemplated within the present disclosure.

In some embodiments, normalization component 122 normalizes (e.g., scales) the metrics collected by diagnostic component 120. Advantageously, normalization component 122 normalizes metrics across associated emulators (e.g., virtual machines) in order to standardize the impact of contended resources, since some emulators may experience different resource contention than others. For example, collected metrics can be normalized with respect to characteristics of input(s) and/or task(s) associated with an application or framework operating in the distributed environment. In one example, collected metrics can be normalized with respect to a particular distributed task by dividing the value of a collected metric by a representative characteristic of the task, such as a computation cost(s) of the task, a quantity of associated traffic involved to complete the task, and the like. More generally, the performance of a particular metric can vary across all associated emulators (e.g., virtual machines). For example, loads may be unpredictable for a particular virtual machine at any given time. As such, normalization component 122 can determine the size of a particular computation, collect a corresponding metric from a virtual machine assisting with the computation, and then scale the metric for that virtual machine by the size of the overall computation across all associated virtual machines assisting with the computation in order to normalize the metric with respect to the associated task. The collected and/or normalized metrics can be used to train anomaly detector 110 and/or resource classifier 112.

Anomaly detector 110 is generally a machine learning model operated or otherwise controlled by a tenant (or a customer thereof) to detect anomalous nodes of the tenant impacted by noisy neighbors. Training data for anomaly detector 110 can be generated based on collected and/or normalized metrics in various ways. By way of nonlimiting example, an application can be operated in a distributed computing environment 104 without noisy-neighbor interference. Baseline metrics can be collected (e.g., by diagnostic component 120) and labeled as healthy behavior. Similarly, the application can be run while interference is selectively simulated (e.g., by interference simulator 118) along different resource dimensions and in selected nodes. When particular resources are impacted, corresponding metrics can be collected and labeled anomalous. This labeled data can be used as a training dataset for anomaly detector 110, which may, in some embodiments, be a k-means nearest neighbor classifier or other suitable model. A feature vector can be constructed from designated metrics (e.g., normalized metrics) and used as an input to train anomaly detector 110 with the training data to detect an anomaly on a node of the tenant based on the distance between the feature vector and the centroids of k-means clusters. In embodiments, anomaly detector 110 is operated or otherwise controlled by a tenant of distributed computing environment 104.

In some embodiments, anomaly detector 110 can be used to detect anomalies from among a plurality of nodes of the tenant, and in some cases, for all nodes of the tenant. Additionally and/or alternatively, multiple anomaly detectors can be applied, for example, with a single anomaly detector dedicated to identifying anomalies in one or more nodes and another anomaly detector dedicated to identifying anomalies in the remaining nodes. As such, these techniques can model healthy and anomalous behavior associated with an application or framework operated by a tenant. In this manner, anomaly detector 110 can automatically identify nodes that are impacted by noisy-neighbors, for example, in real time.

In the embodiment illustrated in FIG. 1, resource classifier 112 automatically identifies (e.g., predicts) which resource is contended during an anomaly. Resource classifier 112 is generally a machine learning model (e.g., a neural network) operated or otherwise controlled by a tenant (or a customer thereof) to identify which resource is contended using the collected and/or normalized metrics (e.g., collected by diagnostic component 120). For example, resource classifier 112 can be trained to identify a particular contended resource using the same collected application-level and/or framework-level metrics used to train anomaly detector 110. In this manner, a resource classifier can be used to attribute performance degradation resulting from resource contention to a particular shared resource.

Resource classifier 112 can be trained in various ways. By way of nonlimiting example, the Euclidean-distance between an input feature vector reflecting the collected (e.g., normalized) metrics and the centroids of k-means clusters can be calculated and labelled according to the corresponding resource contention that was simulated. In some embodiments, the number of classes (e.g., labels) of resource classifier 112 is equal to the number of contended resources identified during benchmark testing. Using this labelled training data, the resource classifier can be trained to identify (e.g., predict), from a given anomalous vector of metrics, which resource is being contended by a noisy-neighbor. In this manner, nodes of a tenant experiencing interference from a noisy neighbor can be automatically identified by the tenant, and the corresponding contended resource can be automatically identified by the tenant.

Generally, the output of anomaly detector 110 and/or resource classifier 112 can indicate (e.g., to a tenant, a customer of a tenant, or other associated user) whether an application hosted in a distributed computing environment is suffering from interference, and if so, which resource is being contended. As such, mitigation component 114 can generate a trigger signal based on the output of anomaly detector 110 and/or resource classifier 112 to facilitate a mitigation of the interference and an associated performance degradation. The trigger signal can trigger various types of mitigation techniques. In embodiments in which the anomaly detector 110, resource classifier 112, and/or mitigation component 114 are operated or controlled by a tenant, the resulting mitigation techniques are considered tenant-triggered mitigation techniques. Among other mitigation techniques contemplated herein, the trigger signal can trigger an application/framework-specific mitigation strategy such as triggered approximations in application/framework performance, best-efforts paths, run-time changes, and the like. For analytics services, approximations can be used for various operations, including by way of nonlimiting example, ReduceByKey, GroupByKey, and the like. In some embodiments, the signal can trigger load-balancing by adjusting weights of a load balancer. Additionally and/or alternatively, the signal can trigger spawning new computer system emulators. In some embodiments, the signal can trigger updates to a scheduler to avoid affected nodes. Various other mitigation techniques that can reduce pressure on a contended resource and/or achieve low latency in the presence of interference are contemplated herein. Tenant-triggered mitigation techniques such as these can avoid unnecessary debugging by the tenant and the concomitant expenditure of computing resources.

Additionally and/or alternatively, mitigation component 114 can generate and/or deliver a notification (e.g., to client device 102A) indicating a particular resource contention to a tenant, an end user (e.g., a customer of a tenant), a cloud provider, and the like, to provide an indication of anticipated performance delays and/or to facilitate various mitigating steps to reduce pressure on a contended resource. As such, mitigation component 114 can enable the tenant, end users, and/or the cloud provider to engage in other mitigation techniques to alleviate or otherwise work around the performance degradation.

Generally, the models described herein (e.g., anomaly detector 110 and/or resource classifier 112) can be used to detect and classify interference issues associated with operating a particular application in a distributed computing environment. In some embodiments, a determination can be made (e.g., by a tenant) whether to operate the models (e.g., anomaly detector 110 and/or resource classifier 112) at the same physical location (e.g., node(s)) that the underlying application is operating. Various architectures may facilitate various benefits. For example, many applications operating in a distributed computing environment utilize a centralized, master node to coordinate distributed computations. Placing a model at the master node can assist with mitigation techniques such as triggered approximations. More specifically, techniques such as triggered approximations may involve collecting data across multiple virtual machines and/or nodes. By placing models that likewise collect and/or utilize metrics from various distributed sources, the models and associated mitigation components can make use of the same centralized architecture, resulting in various efficiency gains such as reduced processing demands and improved speeds. Further, when an issue arises and a node experiences interference, the master node is unlikely to be impacted. As such, locating the models on the master node can increase reliability of the models. In some embodiments, the model(s) can be co-located with virtual machine(s) running a particular application. Containers are increasingly being used to package all necessary components, for example, in one binary large object (blob). Including model(s) (e.g., trained for a particular application) in a container for the application can facilitate simple deployment and management, thereby lowering overhead and reducing the need to perform associated computing tasks. These architectures are meant merely as examples, and any suitable architecture may be implemented.

As such, using implementations described here, a tenant or customer thereof can automatically detect, classify, and mitigate performance degradation resulting from a noisy neighbor. These techniques can enable tenants to detect impacted applications, identify a contended resource, and take steps to mitigate the contention. Various application-level and/or framework-level metrics can be used to build machine-learning models to automatically detect and classify contentions. Corresponding signals can be used to trigger application/framework-specific mitigation strategies such as triggered approximations and run-time changes, load-balancing, scaling-out, and the like. Various architectures can be implemented to facilitate computational efficiencies. Accordingly, techniques described herein improve upon conventional techniques by reducing dependency on cloud providers and providing tenants with the ability to detect, classify, and mitigate performance degradation resulting from a noisy neighbor.

Exemplary Flow Diagrams

Figure 2:
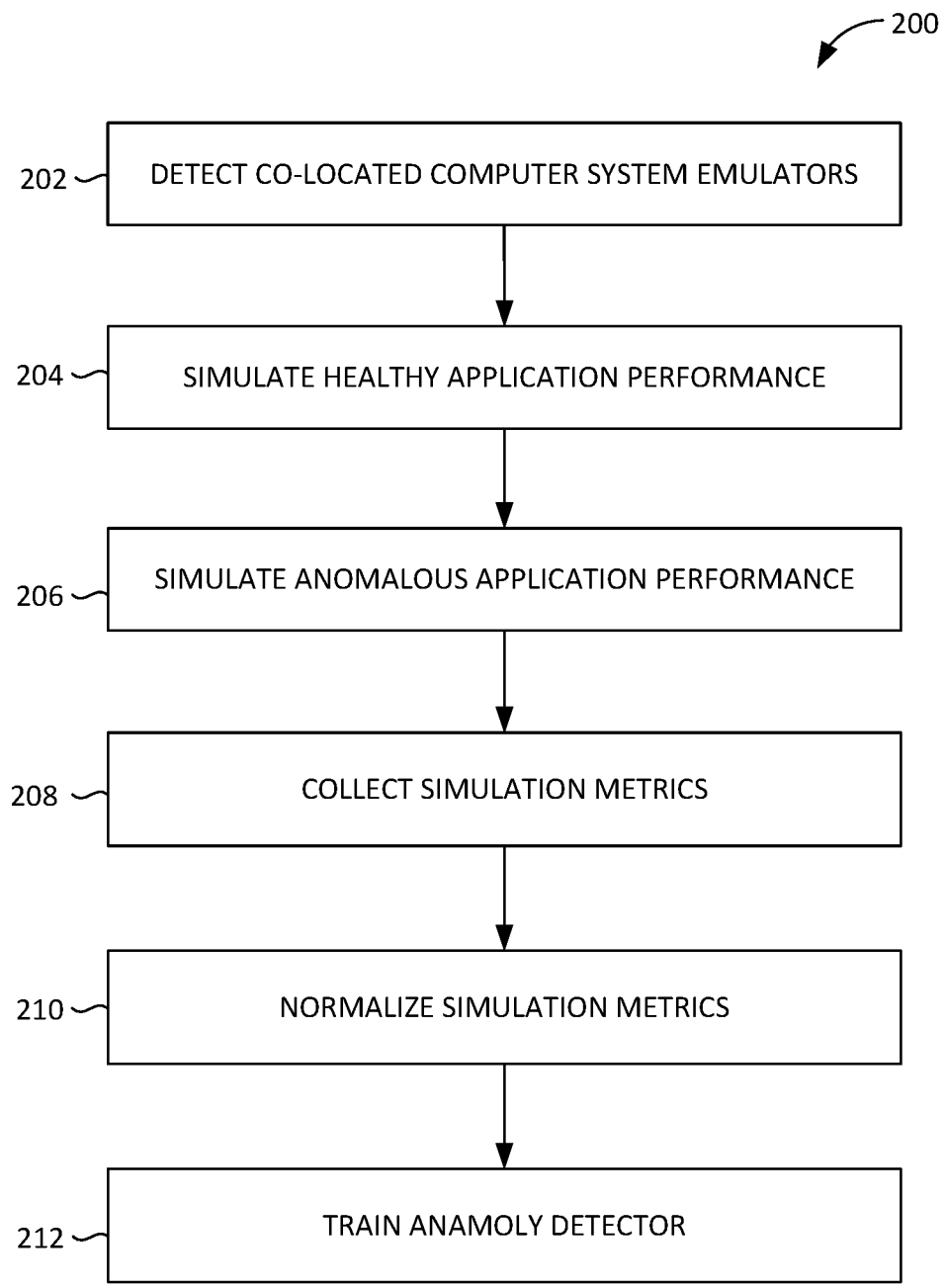
FIG. 2 is a flow chart diagram illustrating a method to train an anomaly detector, in accordance with some implementations of the present disclosure.
Figure 3:
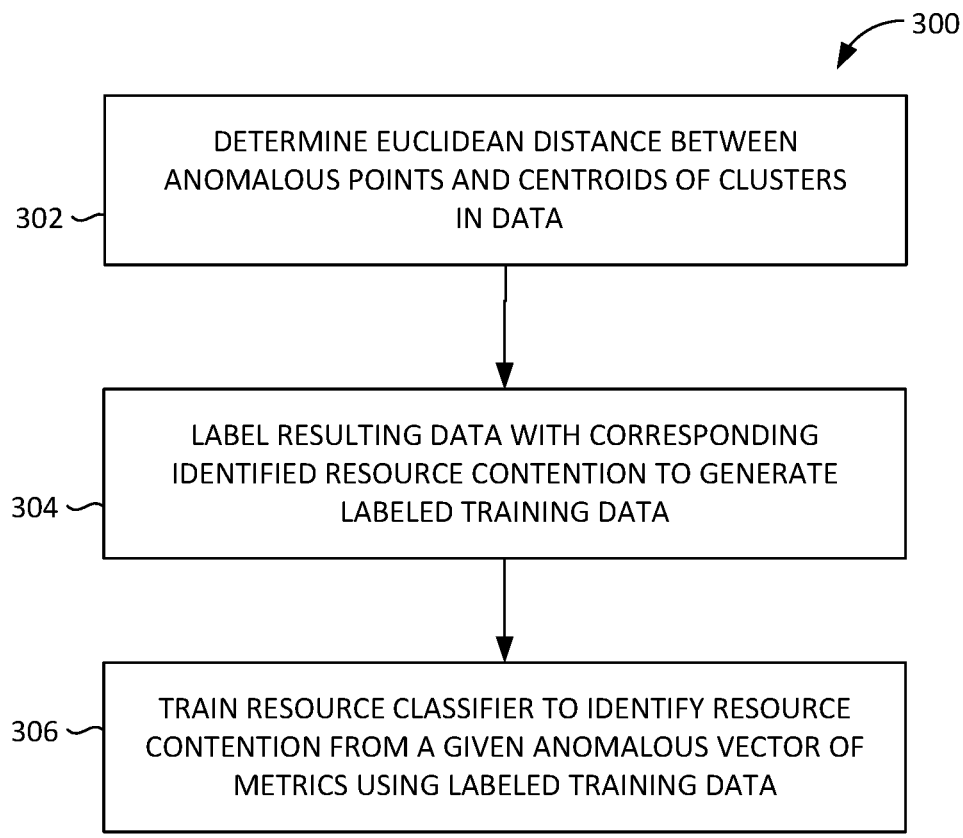
FIG. 3 is a flow chart diagram illustrating a method to train a resource classifier, in accordance with some implementations of the present disclosure.
Figure 4:
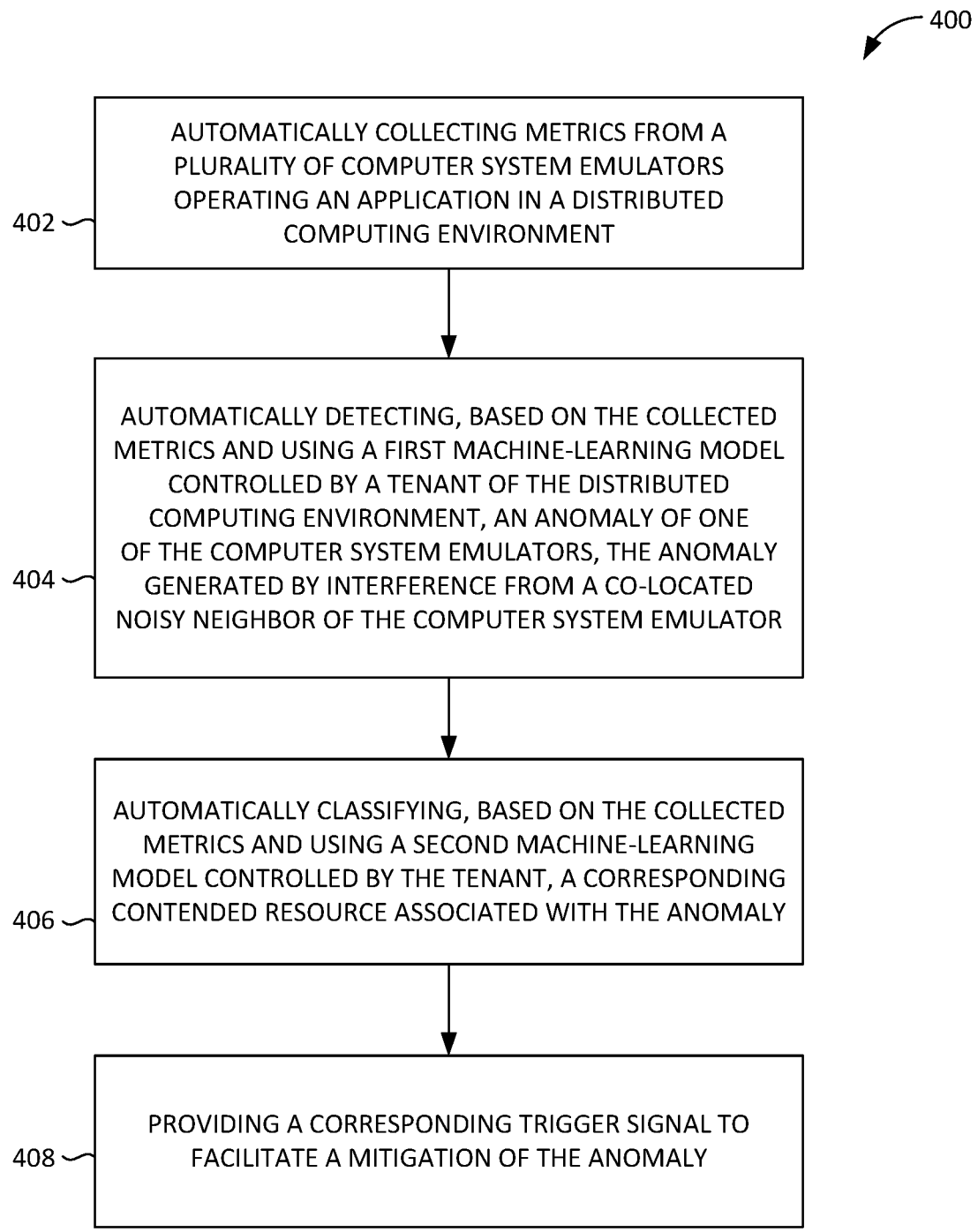
FIG. 4 is a flow chart diagram illustrating a method to detect, classify, and mitigate performance degradation resulting from a noisy neighbor in a distributed computing environment, in accordance with some implementations of the present disclosure.

With reference now to FIGS. 2-4, flow diagrams are provided illustrating methods for facilitating automatic detection, identification, and mitigation of performance degradation due to noisy neighbors. Each block of the methods 200, 300, and 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 2, FIG. 2 illustrates a method 200 for training an anomaly detector, such as anomaly detector 110 of FIG. 1, in accordance with embodiments described herein. Initially, at block 202 the presence of two or more computer system emulators (e.g., virtual machines) on the same physical machine in a cloud environment is detected by a co-location component, such as co-location component 116 of FIG. 1. Co-location ensures that the two or more computer system emulators share the same physical resources. At block 204, healthy application performance is simulated, and at block 206, anomalous application performance is simulated by stressing different shared resources with varying intensities (e.g., by interference simulator 118 of FIG. 1. At block 208, resulting simulation metrics are collected (e.g., by diagnostic component 120 of FIG. 1). At block 210, the collected simulation metrics are normalized (e.g., normalization component 122 of FIG. 1). At block 212, an anomaly detector, such as anomaly detector 110 of FIG. 1 is trained, for example, using a feature vector generated from the normalized simulation metrics and using labeled training data corresponding to the simulated healthy and anomalous application performance.

Turning next to FIG. 3, FIG. 3 illustrates a method 300 for training a resource classifier, such as resource classifier 112 of FIG. 1, in accordance with embodiments described herein. In some embodiments, a resource classifier (e.g., a neural network) can be trained to identify (e.g., predict) which resource is contended during an anomaly. Initially at block 302, the training data from block 212 of FIG. 2 is used to determine Euclidean-distance between anomalous points and centroids of clusters in the training data. At block 304, the resulting data is labeled with the corresponding identified resource contention that was simulated to generate labeled training data. In some embodiments, the number of classes (e.g., labels) is equal to the number of contended resources identified during benchmark testing (e.g., performed by interference simulator 118 of FIG. 1). At block 306, a resource classifier is trained using the labeled training data to identify, from a given anomalous vector of metrics, which resource is being contended by a noisy neighbor.

Turning now to FIG. 4, FIG. 4 illustrates a method 400 for mitigating performance degradation in a distributed computing environment. Initially at block 402, metrics are automatically collected from a plurality of computer system emulators operating an application in a distributed computing environment. At block 404, an anomaly of one of the computer system emulators is automatically detected based on the collected metrics and using a first machine-learning model controlled by a tenant of the distributed computing environment. The anomaly was generated by interference from a co-located noisy neighbor of the computer system emulator. At block 406, corresponding contended resource associated with the anomaly is automatically classified based on the collected metrics and using a second machine-learning model controlled by the tenant. At block 408, a corresponding trigger signal is provided to facilitate a mitigation of the anomaly.

Exemplary Computing Environment

Figure 5:
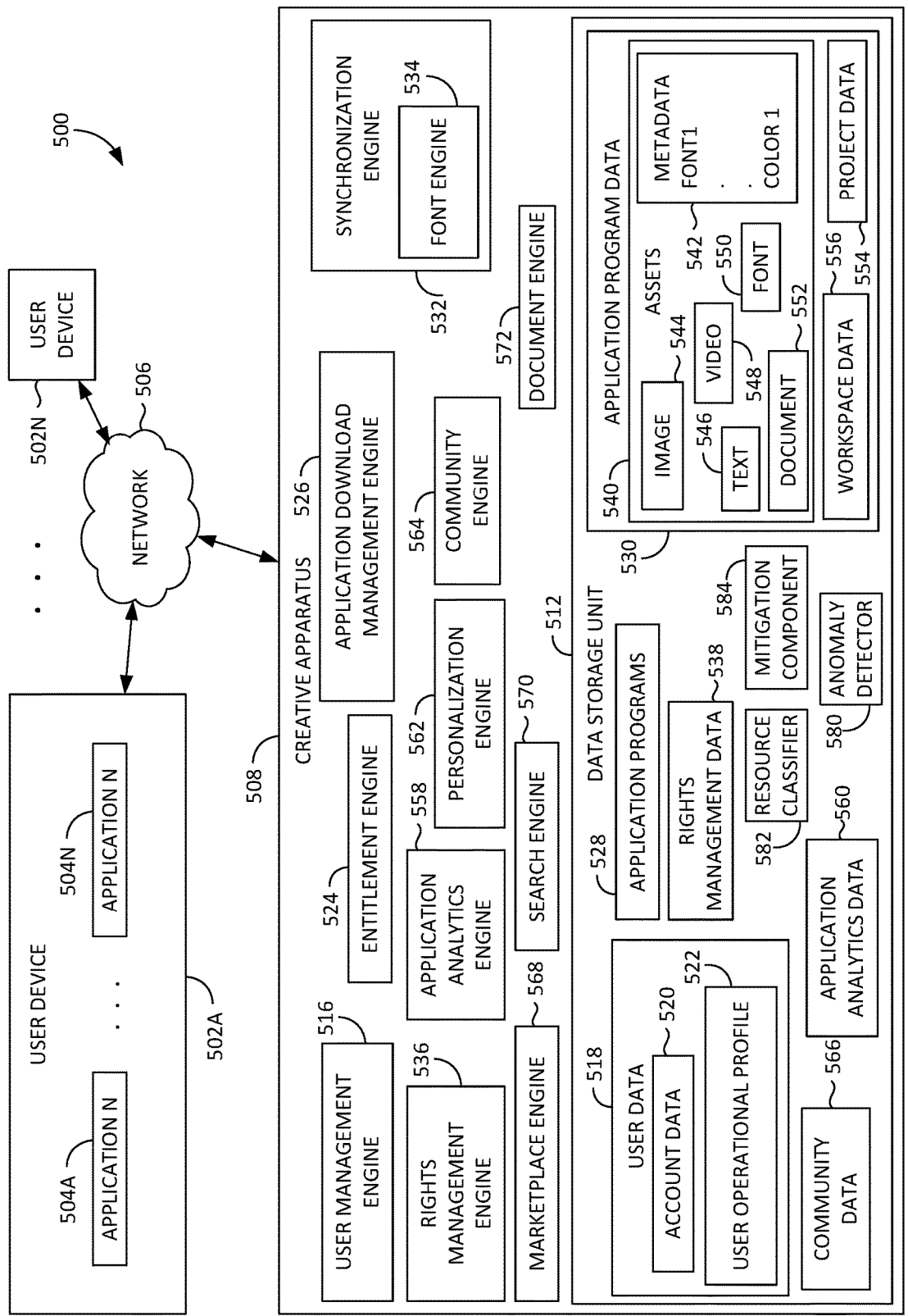
FIG. 5 is a block diagram of an exemplary computing environment in which embodiments of the present disclosure may be employed.

Turning now to FIG. 5, FIG. 5 is a diagram of environment 500 in which one or more embodiments of the present disclosure can be practiced. Environment 500 includes one or more user devices, such as user devices 502A through 502N. Examples of user devices include, but are not limited to, a personal computer (PC), tablet computer, a desktop computer, cellular telephone, a processing unit, any combination of these devices, or any other suitable device having one or more processors. Each user device includes at least one application supported by creative apparatus 508. It is to be appreciated that following description may generally refer to user device 502A as an example and any other user device can be used.

A user of the user device can utilize various products, applications, or services supported by creative apparatus 508 via network 506. User devices 502A through 502N can be operated by various users. Examples of the users include, but are not limited to, financial professionals who use application tools to monitor financial content, educational professionals who application tools to generate, edit, track, or manage educational content, medical professionals who use application tools to update, edit, and record medical record content, any combination of these users, or any other user who uses application tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes creative apparatus 508.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 502A through 502N can be connected to creative apparatus 508 via network 506. Examples of network 506 include, but are not limited to, internet, local area network (LAN), wireless area network, wired area network, wide area network, and the like.

Creative apparatus 508 includes one or more engines for providing one or more digital experiences to the user. Creative apparatus 508 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. Creative apparatus 508 also includes data storage unit 512. Data storage unit 512 can be implemented as one or more databases or one or more data servers. Data storage unit 512 includes data that is used by the engines of creative apparatus 508.

Data storage unit 512 also includes, among other components, anomaly detector 580, resource classifier 582, and mitigation component 584. Generally, anomaly detector 580 can detect anomalous nodes impacted by noisy neighbors, resource classifier 582 can identify (e.g., predict) which resource is contended during an anomaly, and mitigation component 584 can facilitate mitigation of performance degradation to a tenant, end user, or both. In various embodiments, anomaly detector 580, resource classifier 582, and/or mitigation component 584 may be operated, controlled, or otherwise accessed by a tenant (or a customer of a tenant) to provide corresponding functionality to the tenant (or customer thereof). For example, anomaly detector 580, resource classifier 582, and/or mitigation component 584 can facilitate tenant-side detection of anomalies resulting from noisy neighbors, classification of a corresponding contended resource, and/or mitigation (e.g., automatic mitigation) of the anomaly. Any or all of these components and/or corresponding functions can be made accessible to the tenant (or customer thereof) without input from or action by the cloud computing provider.

A user of user device 502A visits a webpage or an application store to explore applications supported by creative apparatus 508. Creative apparatus 508 provides the applications as a software as a service (SaaS), or as a standalone application that can be installed on user device 502A, or as a combination. The user can create an account with creative apparatus 508 by providing user details and also by creating login details. Alternatively, creative apparatus 508 can automatically create login details for the user in response to receipt of the user details. In some embodiments, the user is also prompted to install an application manager. The application manager enables the user to manage installation of various applications supported by creative apparatus 508 and also to manage other functionalities, such as updates, subscription account and the like, associated with the applications. User details are received by user management engine 516 and stored as user data 518 in data storage unit 512. In some embodiments, user data 518 further includes account data 520 under which the user details are stored.

The user can either opt for a trial account or can make payment based on type of account or subscription chosen by the user. Alternatively, the payment can be based on product or number of products chosen by the user. Based on payment details of the user, user operational profile 522 is generated by entitlement engine 524. User operational profile 522 is stored in data storage unit 512 and indicates entitlement of the user to various products or services. User operational profile 522 also indicates type of user, i.e. free, trial, student, discounted, or paid.

In some embodiment, user management engine 516 and entitlement engine 524 can be one single engine performing the functionalities of both the engines.

The user can then install various applications supported by creative apparatus 508 via an application download management engine 526. Application installers or application programs 528 present in data storage unit 512 are fetched by application download management engine 526 and made available to the user directly or via the application manager. In one embodiment, an indication of all application programs 528 are fetched and provided to the user via an interface of the application manager. In another embodiment, an indication of application programs 528 for which the user is eligible based on user's operational profile are displayed to the user. The user then selects application programs 528 or the applications that the user wants to download. Application programs 528 are then downloaded on user device 502A by the application manager via the application download management engine 526. Corresponding data regarding the download is also updated in user operational profile 522. Application program 528 is an example of the digital tool. Application download management engine 526 also manages the process of providing updates to user device 502A.

Upon download, installation and launching of an application program, in one embodiment, the user is asked to provide the login details. A check is again made by user management engine 516 and entitlement engine 524 to ensure that the user is entitled to use the application program. In another embodiment, direct access is provided to the application program as the user is already logged into the application manager.

The user uses one or more application programs 504A through 504N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 530 in data storage unit 512 by synchronization engine 532. Alternatively or additionally, such data can be stored at the user device, such as user device 502A.

Application program data 530 includes one or more assets 540. Assets 540 can be a shared asset which the user wants to share with other users or which the user wants to offer on a marketplace. Assets 540 can also be shared across multiple application programs 528. Each asset includes metadata 542. Examples of metadata 542 include, but are not limited to, font, color, size, shape, coordinate, a combination of any of these, and the like. In addition, in one embodiment, each asset also includes a file. Examples of the file include, but are not limited to, image 544, text 546, video 548, font 550, document 552, a combination of any of these, and the like. In another embodiment, an asset only includes metadata 542.

Application program data 530 also include project data 554 and workspace data 556. In one embodiment, project data 554 includes assets 540. In another embodiment, assets 540 are standalone assets. Similarly, workspace data 556 can be part of project data 554 in one embodiment while it may be standalone data in other embodiment.

A user can operate one or more user device to access data. For example, user device 502A can initiate a request to generate, edit, track, or manage data (e.g., content). In this regard, application program data 530 is accessible by a user from any device, including a device which was not used to create assets 540. This is achieved by synchronization engine 532 that stores application program data 530 in data storage unit 512 and enables application program data 530 to be available for access by the user or other users via any device. Before accessing application program data 530 by the user from any other device or by any other user, the user or the other user may need to provide login details for authentication if not already logged in. In some cases, if the user or the other user are logged in, then a newly created asset or updates to application program data 530 are provided in real time. Rights management engine 536 is also called to determine whether the newly created asset or the updates can be provided to the other user or not. Workspace data 556 enables synchronization engine 532 to provide a same workspace configuration to the user on any other device or to the other user based on rights management data 538.

In various embodiments, various types of synchronization can be achieved. For example, the user can pick a font or a color from user device 502A using a first application program and can use the font or the color in a second application program on any other device. If the user shares the font or the color with other users, then the other users can also use the font or the color. Such synchronization generally happens in real time. Similarly, synchronization of any type of application program data 530 can be performed.

In some embodiments, user interaction with applications 504 is tracked by application analytics engine 558 and stored as application analytics data 560. Application analytics data 560 includes, for example, usage of a tool, usage of a feature, usage of a workflow, usage of assets 540, and the like. Application analytics data 560 can include the usage data on a per user basis and can also include the usage data on a per tool basis or per feature basis or per workflow basis or any other basis. Application analytics engine 558 embeds a piece of code in applications 504 that enables the application to collect the usage data and send it to application analytics engine 558. Application analytics engine 558 stores the usage data as application analytics data 560 and processes application analytics data 560 to draw meaningful output. For example, application analytics engine 558 can draw an output that the user uses "Tool 4" a maximum number of times. The output of application analytics engine 558 is used by personalization engine 562 to personalize a tool menu for the user to show "Tool 4" on top. Other types of personalization can also be performed based on application analytics data 560. In addition, personalization engine 562 can also use workspace data 556 or user data 518 including user preferences to personalize one or more application programs 528 for the user.

In some embodiments, application analytics data 560 includes data indicating status of a project of the user. For example, if the user was preparing an article in a digital publishing application and what was left was publishing the prepared article at the time the user quit the digital publishing application, then application analytics engine 558 tracks the state. Now when the user next opens the digital publishing application on another device, then the user is indicated and the state and options are provided to the user for publishing using the digital publishing application or any other application. In addition, while preparing the article, a recommendation can also be made by synchronization engine 532 to incorporate some of other assets saved by the user and relevant for the article. Such a recommendation can be generated using one or more engines, as described herein.

Creative apparatus 508 also includes community engine 564 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes application program data 540. Community engine 564 stores any data corresponding to the community, such as work shared on the community and comments or likes received for the work as community data 566. Community data 566 also includes notification data and is used for notifying other users by the community engine in case of any activity related to the work or new work being shared. Community engine 564 works in conjunction with synchronization engine 532 to provide collaborative workflows to the user. For example, the user can create an image and can request for some expert opinion or expert editing. An expert user can then either edit the image as per the user liking or can provide expert opinion. The editing and providing of the expert opinion by the expert is enabled using community engine 564 and synchronization engine 532. In collaborative workflows, a plurality of users is assigned different tasks related to the work.

Creative apparatus 508 also includes marketplace engine 568 for providing marketplace to one or more users. Marketplace engine 568 enables the user to offer an asset for selling or using. Marketplace engine 568 has access to assets 540 that the user wants to offer on the marketplace. Creative apparatus 508 also includes search engine 570 to enable searching of assets 540 in the marketplace. Search engine 570 is also a part of one or more application programs 528 to enable the user to perform search for assets 540 or any other type of application program data 530. Search engine 570 can perform a search for an asset using metadata 542 or the file.

Creative apparatus 508 also includes document engine 572 for providing various document related workflows, including electronic or digital signature workflows, to the user. Document engine 572 can store documents as assets 540 in data storage unit 512 or can maintain a separate document repository (not shown in FIG. 5).

It is to be appreciated that the engines and working of the engines are described as examples herein, and the engines can be used for performing any step in providing digital experience to the user.

Exemplary Operating Environment

Figure 6:
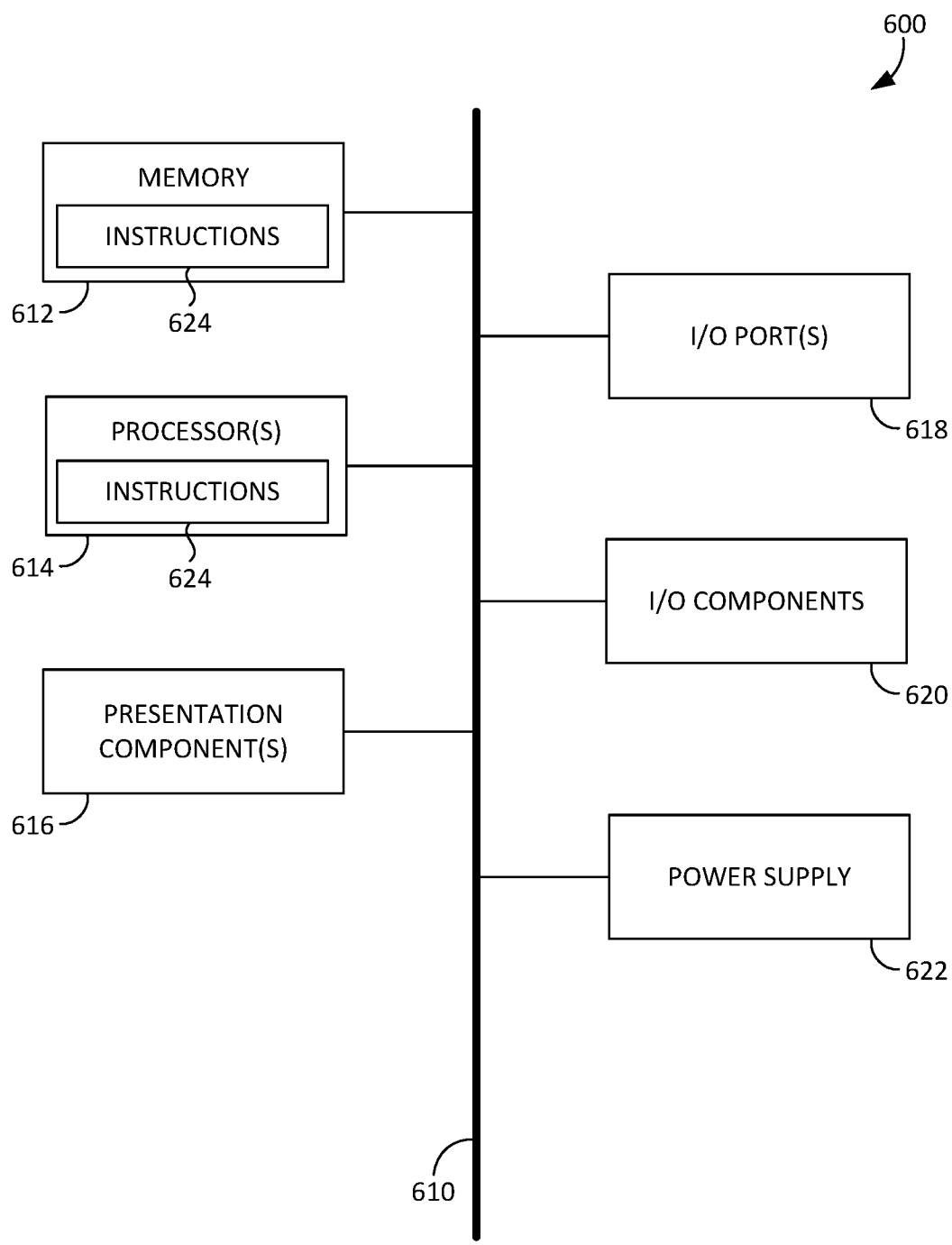
FIG. 6 is a block diagram of an exemplary computing environment suitable for use in implementing embodiments of the present disclosure.

Having described an overview of embodiments of the present invention, an exemplary operating environment in which embodiments of the present invention may be implemented is described below in order to provide a general context for various aspects of the present invention. Referring now to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The invention may be described in the general context of computer code or machine-useable instructions (e.g., instructions 624), including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 600. Computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of computing device 600 to render immersive augmented reality or virtual reality.

Embodiments described herein support detecting, classifying, and mitigating noisy-neighbor induced performance degradation. The components described herein refer to integrated components of a tenant-side mitigation system. The integrated components refer to the hardware architecture and software framework that support functionality using the tenant-side mitigation system. The hardware architecture refers to physical components and interrelationships thereof and the software framework refers to software providing functionality that can be implemented with hardware embodied on a device.

The end-to-end software-based tenant-side mitigation system can operate within the tenant-side mitigation system components to operate computer hardware to provide tenant-side mitigation system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the tenant-side mitigation system components can manage resources and provide services for the tenant-side mitigation system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied when one or more features are present. Also, the term "or" includes the conjunctive, the disjunctive and both (a or b thus includes either a or b, as well as a and b).

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
  causing an application or framework of a first tenant of a cloud computing environment to run inside one or more computer system emulators on one or more nodes in the cloud computing environment;
  causing a machine-learning model controlled by the first tenant to classify, based on performance metrics of the application or framework, a contended resource of the cloud computing environment associated with interference from a second tenant of the cloud computing environment; and
  triggering, by an operation controlled by the first tenant, a mitigation of the interference.

2. The computer-implemented method of claim 1, further comprising storing the machine-learning model on a master node that coordinates distributed computations of the application or framework in the cloud computing environment.

3. The computer-implemented method of claim 1, further comprising co-locating the machine-learning model with at least one of the one or more computer system emulators on the one or more nodes.

4. The computer-implemented method of claim 1, wherein the one or more computer system emulators comprise one or more software containers, the method further comprising packaging the machine-learning model in one of the one or more software containers for the application or framework.

5. The computer-implemented method of claim 1, wherein the mitigation of the interference comprises at least one of a tenant-triggered load-balancing or a tenant-triggered scaling out.

6. The computer-implemented method of claim 1, wherein the mitigation of the interference comprises an application-specific or framework-specific mitigation strategy specific to the application or framework.

7. The computer-implemented method of claim 6, wherein the application-specific mitigation strategy comprises at least one of an automatically triggered approximation associated with operation of the application or an automatically triggered change to a run-time operation of the application.

8. The computer-implemented method of claim 1, further comprising causing another machine-learning model controlled by the first tenant to detect the interference based on the performance metrics.

9. One or more computer storage media storing computer-useable instructions, that, when executed by one or more computing devices, cause the one or more computing devices to perform operations comprising:
  causing an application or framework of a first tenant of a cloud computing environment to run inside one or more computer system emulators on one or more nodes in the cloud computing environment;
  causing a machine-learning model controlled by the first tenant to classify, based on performance metrics of the application or framework, a contended resource of the cloud computing environment associated with interference from a second tenant of the cloud computing environment; and
  triggering, based on the contended resource and by an operation controlled by the first tenant, a mitigation of the interference.

10. The one or more computer storage media of claim 9, the operations further comprising storing the machine-learning model on a master node that coordinates distributed computations of the application or framework in the cloud computing environment.

11. The one or more computer storage media of claim 9, the operations further comprising co-locating the machine-learning model with at least one of the one or more computer system emulators on the one or more nodes.

12. The one or more computer storage media of claim 9, wherein the one or more computer system emulators comprise one or more software containers, the machine-learning model packaged in one of the one or more software containers for the application or framework.

13. The one or more computer storage media of claim 9, wherein the mitigation of the interference comprises at least one of a tenant-triggered load-balancing or a tenant-triggered scaling out.

14. The one or more computer storage media of claim 9, wherein the mitigation of the interference comprises an application-specific or framework-specific mitigation strategy specific to the application or framework.

15. The one or more computer storage media of claim 14, wherein the application-specific mitigation strategy comprises at least one of an automatically triggered approximation associated with operation of the application or an automatically triggered change to a run-time operation of the application.

16. A computer system comprising one or more hardware processors and one or more computer storage media storing computer-useable instructions, that, when executed by the one or more hardware processors, cause the one or more hardware processors to perform operations comprising:
  causing an application or framework of a first tenant of a cloud computing environment to run inside one or more computer system emulators on one or more nodes in the cloud computing environment;
  causing a machine-learning model controlled by the first tenant to classify, based on performance metrics of the application or framework, a contended resource of the cloud computing environment associated with interference from a second tenant of the cloud computing environment; and
  triggering, based on the contended resource and by an operation controlled by the first tenant, a mitigation of the interference.

17. The computer system of claim 16, the operations further comprising storing the machine-learning model on a master node that coordinate s distributed computations of the application or framework in the cloud computing environment.

18. The computer system of claim 16, the operations further comprising co-locating the machine-learning model with at least one of the one or more computer system emulators on the one or more nodes.

19. The computer system of claim 16, wherein the one or more computer system emulators comprise one or more software containers, the machine-learning model packaged in one of the one or more software containers for the application or framework.

20. The computer system of claim 16, wherein the mitigation of the interference comprises at least one of a tenant-triggered load-balancing or a tenant-triggered scaling out.

\* \* \* \* \*

UNITED STATES PATENT AND TRADEMARK OFFICE
CERTIFICATE OF CORRECTION

PATENT NO. : 11,947,986 B2
APPLICATION NO. : 17/355481
DATED : April 2, 2024
INVENTOR(S) : Subrata Mitra et al.

It is certified that error appears in the above-identified patent and that said Letters Patent is hereby corrected as shown below:

On the Title Page

Item (56) Under OTHER PUBLICATIONS:
• Line 2, "Medium. com" should be deleted. It should read -- Medium.com --.

In the Claims

• Column 21, Line 42, "coordinate s" should be deleted. It should read -- coordinates --.

• Column 23, Line 3, "coordinate s" should be deleted. It should read -- coordinates --.

Signed and Sealed this
Third Day of September, 2024

Katherine Kelly Vidal
*Director of the United States Patent and Trademark Office*